US007218416B2

(12) United States Patent
Igari

(10) Patent No.: US 7,218,416 B2
(45) Date of Patent: May 15, 2007

(54) IMAGE PROCESSING APPARATUS AND METHOD

(75) Inventor: Toshinori Igari, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 950 days.

(21) Appl. No.: 10/420,729

(22) Filed: Apr. 23, 2003

(65) Prior Publication Data

US 2003/0202027 A1   Oct. 30, 2003

(30) Foreign Application Priority Data

Apr. 25, 2002   (JP) .............................. 2002-124369

(51) Int. Cl.
H04N 1/405   (2006.01)
H04N 1/409   (2006.01)

(52) U.S. Cl. .................................... 358/3.05; 358/3.26

(58) Field of Classification Search ................. 358/1.9, 358/3.06, 3.03–3.05, 534, 466, 3.22, 3.26; 382/252, 270, 268, 275
See application file for complete search history.

(56) References Cited

U.S. PATENT DOCUMENTS 5,974,228 A * 10/1999 Heitsch ...................... 358/1.9

6,373,990 B1 * 4/2002 Ushida et al. .............. 382/252

FOREIGN PATENT DOCUMENTS

| EP | 1 005 221 A2 | 5/2000 |
| JP | 10-44530 | 2/1998 |
| JP | 10-329383 | 12/1998 |
| JP | 2000/158714 | 6/2000 |

* cited by examiner

Primary Examiner—Scott A. Rogers
(74) Attorney, Agent, or Firm—Fitzpatrick, Cella, Harper & Scinto

(57) ABSTRACT

Entered image data is stored in a page buffer on a per-page basis, and image data that has been stored in the page buffer is subjected to error diffusion processing on a per-raster basis, thereby creating and outputting binarized data. Sub-scanning direction error due to error diffusion processing is stored in an error buffer at the time of binarization. The error buffer is initialized based upon positions, in the sub-scanning direction, of a raster that underwent error diffusion processing immediately previously and a raster to undergo error diffusion processing, and the number of rasters on a page. As a result, it is possible to avoid a deterioration in image quality at page boundaries and at the beginning of an image simultaneously when data for printing on elongated sheets of paper is processed.

12 Claims, 10 Drawing Sheets

IMAGE PROCESSING APPARATUS AND METHOD

FIELD OF THE INVENTION

This invention relates to an image processing apparatus and method and, more particularly, to an image processing apparatus and method for applying binarization processing to image data extending over a plurality of pages.

BACKGROUND OF THE INVENTION

An ink-jet printing apparatus that forms an image on a printing medium by ejecting ink droplets onto the medium from a printhead has been proposed as an apparatus for printing documents and images generated by a computer. An ink-jet printer generally expresses an output image by absence or presence of dots formed by the ink droplets.

Accordingly, a printer driver installed in a host device connected to such an ink-jet printer sends the ink-jet printer print data, which is obtained by subjecting an input image acquired from an application program to color conversion processing and then executing binarization processing by pseudo-gray-scaling means such as the error diffusion method, and the inkjet printer forms an output image by ejecting ink droplets in accordance with the print data received.

The error diffusion method is described in "An Adaptive Algorithm for Spatial Gray Scale", by R. Floyd, et al., SID International Symposium Digest of Technical Papers, vol. 4.3, 1975. As shown in FIG. 4, this method, where P represents a pixel of interest, v the density of this pixel, v0, v1, v2 and v3 the densities of unbinarized pixels P0, P1, P2 and P3, respectively, neighboring the pixel of interest P, and T a threshold value for binarizing these densities, is a method of diffusing binarization error E at the pixel of interest P to the neighboring pixels P0, P1, P2, P3 by weighting coefficients W0, W1, W2, W3, respectively, determined empirically, thereby making mean density of the output image equal to the density of the input image macroscopically.

Errors E0, E1, E2, E3 with regard to the neighboring pixels P0, PI, P2, P3 can be obtained by the following equations, where o represents output binary data:

if $v \geq T$ holds, then $o=1$, $E=v-Vmax$;

if $v \leq T$ holds, then $o=0$, $E=v-Vmin$;

where Vmax and Vmin represent maximum and minimum densities, respectively; and $$E0 = E \times W0 \quad (1)$$

$$E1 = E \times W1 \quad (2)$$

$$E2 = E \times W2 \quad (3)$$

$$E3\ E = W \times 3 \quad (4)$$

Known examples of weighting coefficients are $W0=7/16$, $W1=1/16$, $W2=5/16$, $W3=3/16$.

Since error diffusion processing is executed one raster at a time in the main-scanning direction, generally error in the sub-scanning direction (paper transfer direction) is stored in a storage device referred to as an error buffer and is used at the processing of the next raster.

In a case where a plurality of pages are printed, the image quality of the leading end (beginning) of a page deteriorates when error from the trailing end of the preceding page propagates to the leading end of the aforesaid page. The general practice, therefore, is to initialize the error buffer when a new page begins. Similarly, in a case where a plurality of images 602 and 603 are arrayed in the sub-scanning direction on the same page 601, as shown in FIG. 6, image quality at the upper end of the image 603 deteriorates if error in the sub-scanning direction that has occurred at the lower end of the image 602 propagates to processing of image 603. In a known method, therefore, a deterioration in the image quality at the upper end of the image 603 is similarly prevented by initializing the error buffer immediately before binarization processing of the image 603 is started.

A printing apparatus of the above kind is capable of printing not only on so-called single-cut sheets (referred to as "cut sheets" below) but also on elongated sheets (referred to as "banner sheets" below) such as roll paper or banner paper (such printing shall be referred to as "long-length printing"). In this case, the amount of data that can be handled by an application program generally is limited. When long-length printing is performed, therefore, in general a printer driver is supplied with image data on a per-page basis in a form in which the data, which is for printing one image 702 on an elongated printing medium 701 of the kind shown in FIG. 7, is divided into a plurality of pages.

However, if an image that is originally a single image is simply divided into a plurality of pages and then binarized, a deterioration in image quality occurs at the page boundaries because the error buffer is initialized at these boundaries.

Methods of solving this problem are disclosed in the specifications of Japanese Patent Application Laid-Open Nos. 2000-158714 and 10-329383. These methods prevent a deterioration in image quality at page boundaries by not initializing the error buffer at the boundary of each page when long-length printing is carried out.

With the methods described in the above-mentioned specifications, however, initialization of the error buffer is not always performed at the time of long-length printing. As a consequence, binarization error is propagated between different images and a deterioration in image quality results.

For example, when long-length printing of a banner sheet 801 having a length of two cut sheets and including images 802, 803 is performed, binarization error at the lower edge of the image 802 propagates to the image 803, regardless of the fact that the two images 802 and 803 are separate objects, and therefore a deterioration in image quality occurs.

SUMMARY OF THE INVENTION

Accordingly, an object of the present invention is to provide an image processing apparatus in which it is possible to avoid a deterioration in image quality at page boundaries and at the beginning of images simultaneously when long-length printing data is processed.

Another object of the present invention is to provide an image processing method through which it is possible to avoid a deterioration in image quality at page boundaries and at the beginning of images simultaneously when long-length printing data is processed.

A further object of the present invention is to provide a printer driver in which it is possible to avoid a deterioration in image quality at page boundaries and at the beginning of images simultaneously when long-length printing data is processed.

According to one aspect of the present invention, the foregoing objects are attained by providing an image processing apparatus comprising: a page buffer for storing entered image data on a per-page basis; and binarizing means for subjecting image data, which has been stored in the page buffer, to error diffusion processing on a per-raster basis, thereby generating binarized data, and outputting the binarized data, wherein the binarizing means includes an error buffer for storing sub-scanning direction error due to the error diffusion processing, and error-buffer initializing means for initializing the error buffer based upon positions, in the sub-scanning direction, of a raster that underwent error diffusion processing immediately previously and a raster to undergo error diffusion processing, and number of rasters on a page.

According to another aspect of the present invention, the foregoing objects are attained by providing an image processing method comprising: a page buffering step of storing entered image data in a page buffer on a per-page basis; and a binarizing step of subjecting image data, which has been stored in the page buffer, to error diffusion processing on a per-raster basis, thereby generating binarized data, and outputting the binarized data, wherein the binarizing step includes an error buffering step of storing sub-scanning direction error due to the error diffusion processing in an error buffer, and an error-buffer initializing step of initializing the error buffer based upon positions, in the sub-scanning direction, of a raster that underwent error diffusion processing immediately previously and a raster to undergo error diffusion processing, and number of rasters on a page.

According to a further aspect of the present invention, the foregoing objects are attained by providing a printer driver installed in a host device connected to a printer, comprising code of a program for implementing: a page buffering step of storing entered image data in a page buffer on a per-page basis; and a binarizing step of subjecting image data, which has been stored in the page buffer, to error diffusion processing on a per-raster basis, thereby generating binarized data, and outputting the binarized data, wherein the binarizing step includes an error buffering step of storing sub-scanning direction error due to the error diffusion processing in an error buffer, and an error-buffer initializing step of initializing the error buffer based upon positions, in the sub-scanning direction, of a raster that underwent error diffusion processing immediately previously and a raster to undergo error diffusion processing, and number of rasters on a page.

Thus, according to the present invention, entered image data is stored in a page buffer page by page, image data that has been stored in the page buffer is subjected to error diffusion processing raster by raster, thereby creating and outputting binarized data, sub-scanning direction error due to error diffusion processing is stored in an error buffer at the time of binarization, and the error buffer is initialized based upon positions, in the sub-scanning direction, of a raster that underwent error diffusion processing immediately previously and a raster to undergo error diffusion processing, and number of rasters on a page.

If this arrangement is adopted, whether processing is that applied to the same image on the same page can be determined depending upon whether positions, in the sub-scanning direction, of a raster that underwent error diffusion processing immediately previously and a raster to undergo error diffusion processing are contiguous or not. By comparing the number of a raster that underwent error diffusion processing immediately previously, the number of a raster to undergo error diffusion processing and the number of rasters in page, it is possible to determine whether processing is that applied to an image extending from the trailing end of a page to the leading end of the next page, and the error buffer can be initialized based upon the result of determination.

Accordingly, when image data to be printed on an elongated printing medium is processed, the error buffer is initialized at such time that binarization processing of a different image is executed, irrespective of whether an image extends over a plurality of pages, thereby making it possible to avoid a deterioration in image quality at page boundaries and at the beginning of an image simultaneously when long-length printing data is processed.

The number of rasters on the page can be set with regard to each page when the apparatus has been set in such a manner that image data extending over a plurality of pages is processed as contiguous image data.

The binarizing means may have the error buffer for each of a plurality of colors, and the error-buffer initializing means may initialize the error buffers simultaneously.

Preferably, the error-buffer initializing means initializes the error buffer in a case where positions, in the sub-scanning direction, of a raster that underwent error diffusion processing immediately previously and a raster to undergo error diffusion processing are not contiguous and, moreover, the raster that underwent error diffusion processing immediately previously is not a trailing-end position of a page or the raster to undergo error diffusion processing is not a leading-end position of a page.

The apparatus may further comprise color conversion means for subjecting entered color image data to color conversion processing, wherein the binarized data is output data applied to a printer.

Other features and advantages of the present invention will be apparent from the following description taken in conjunction with the accompanying drawings, in which like reference characters designate the same or similar parts throughout the figures thereof.

DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

<First Embodiment>

Figure 5:
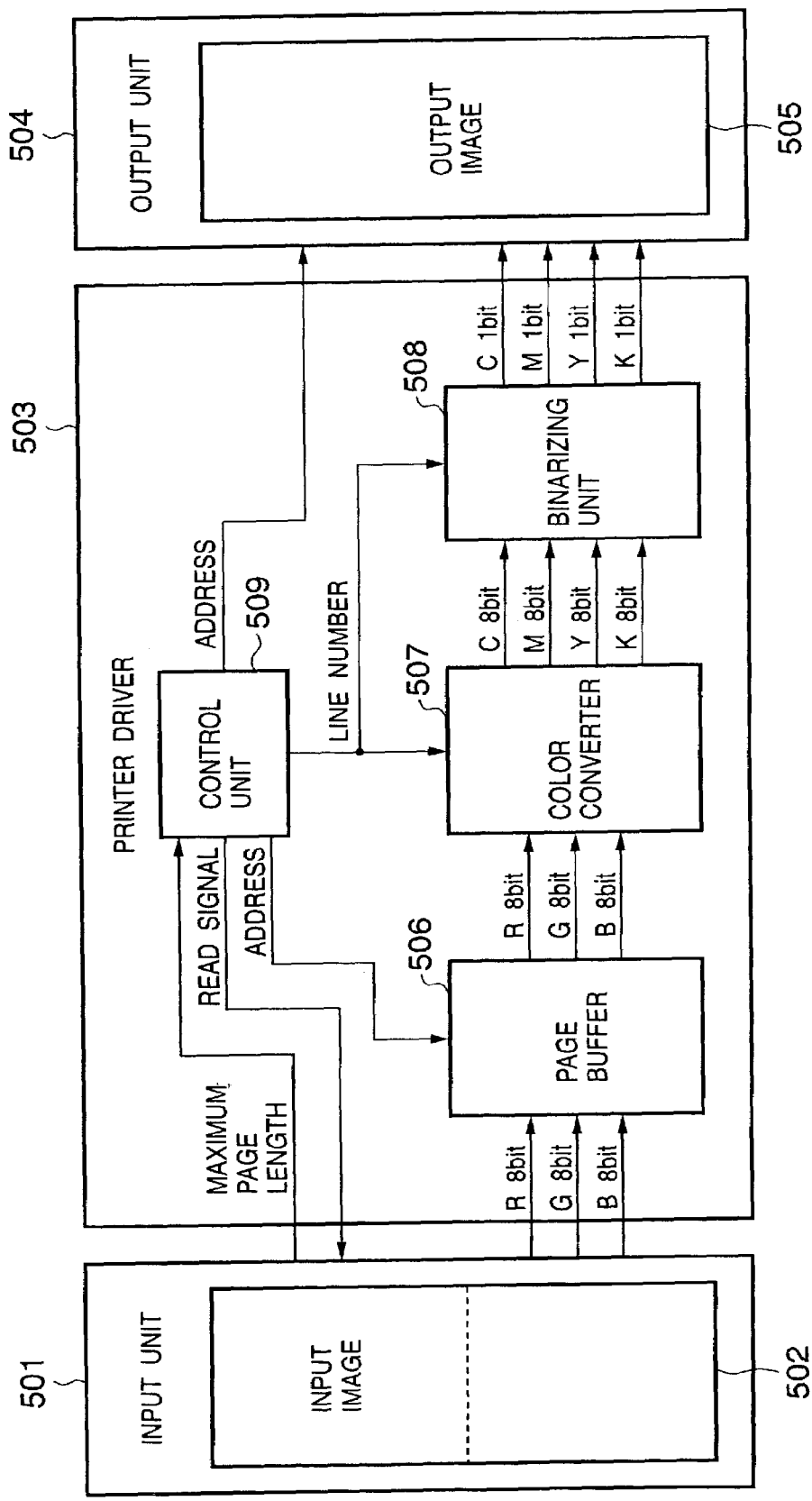
FIG. 5 is a block diagram illustrating the structure of a first embodiment of an image processing apparatus according to the present invention.
Figure 6:
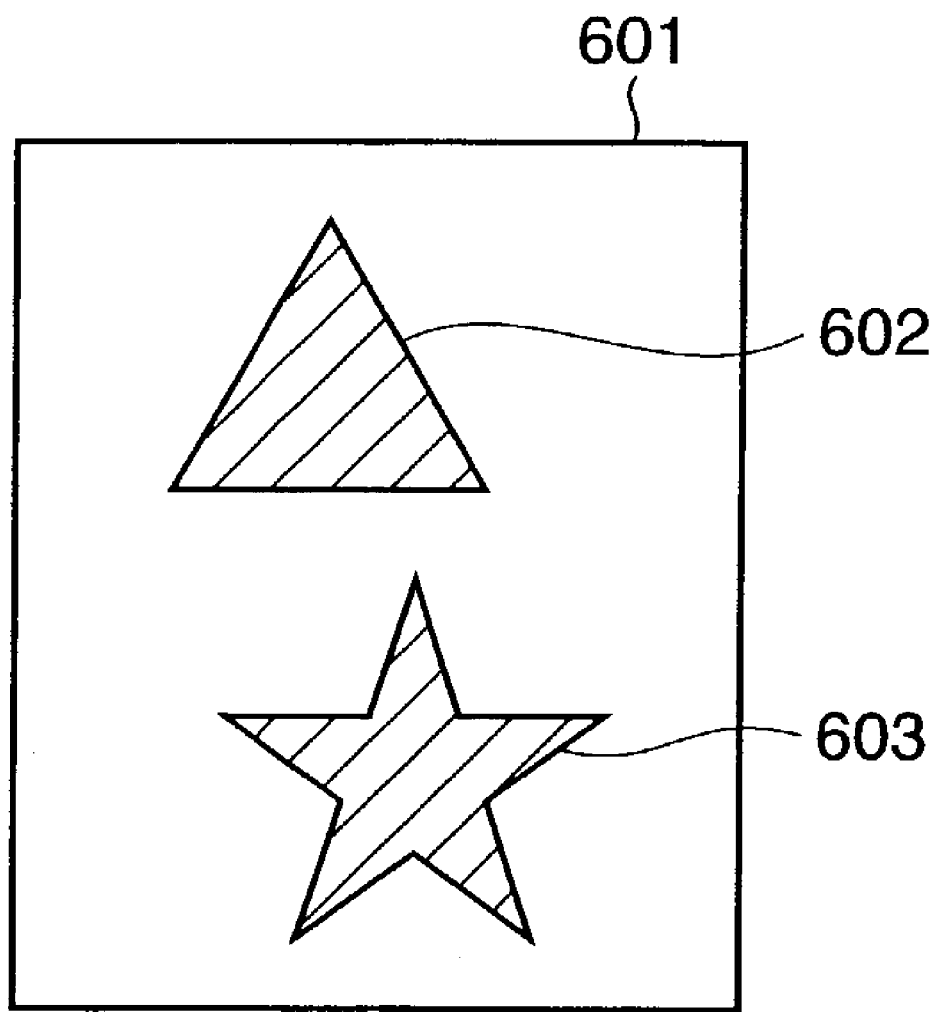
FIG. 6 is a diagram illustrating an example in which a plurality of images are arrayed in the sub-canning direction on the same page of a cut sheet.
Figure 7:
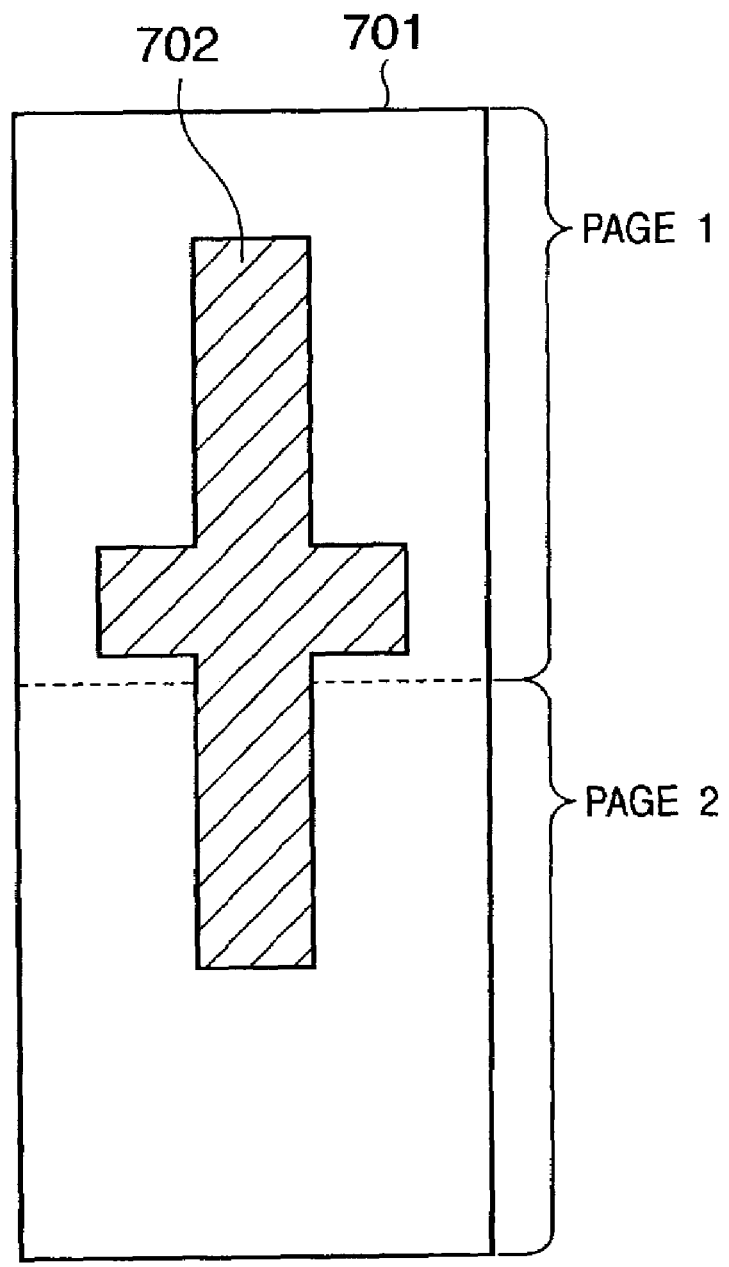
FIG. 7 is a diagram illustrating an example in which an elongated image having a length greater than that of a cut sheet resided in the sub-scanning direction on an elongated sheet.
Figure 8:
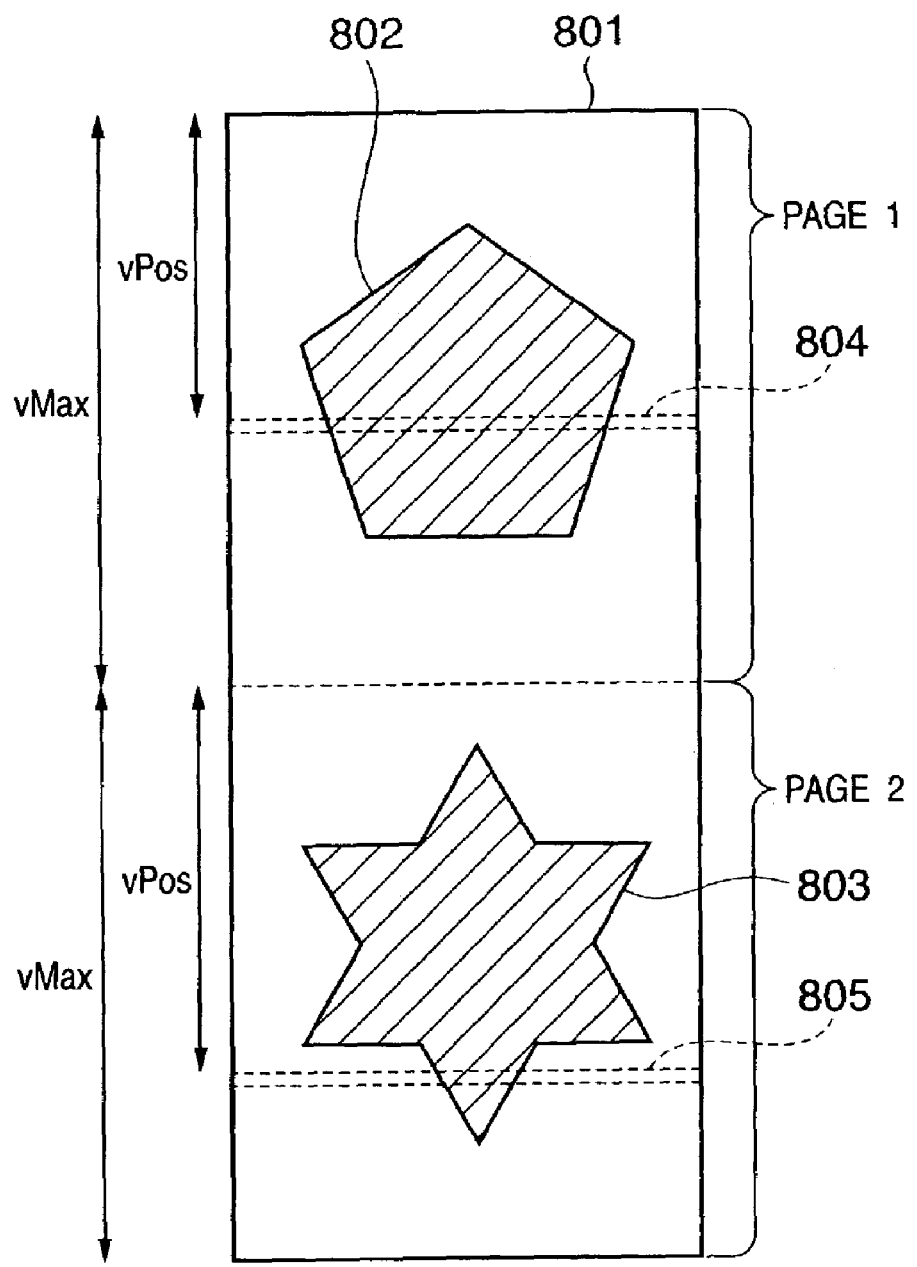
FIG. 8 is a diagram illustrating an example in which a plurality of images are arrayed in the sub-canning direction on an elongated sheet.

FIG. 5 is a block diagram illustrating the structure of a first embodiment of an image processing apparatus according to the present invention.

The image processing apparatus according to this embodiment as illustrated includes an input unit 501, a printer driver 503 and an output unit 504. The input unit 501 transmits an input image 502 to the printer driver 503, and the printer driver 503 subjects the input image to color conversion processing and binarization processing and transmits the processed image to the output unit 504.

The input unit 501 partitions the input image 502 on a per-page basis and transmits the resultant signal to the printer driver 503. In a case where the print setting is for long-length printing, the input unit 501 transmits the information concerning maximum page length (number of lines contained on one page) to the printer driver 503.

The printer driver 503 comprises a page buffer 506, a color converter 507, a binarizing unit 508 and a control unit 509. The control unit 509 transmits a read signal to the input unit 501, in response to which the page-by-page input image, which is transmitted from the input unit 501, is stored in the page buffer 506. In a case where the input image 502 is printed by long-length printing, the information concerning maximum page length transmitted from the input unit 501 is stored as an internal variable.

Next, the control unit 509 transmits an address signal to the page buffer 506, in response to which image data is transmitted from the page buffer 506 to the color converter 507 on a per-raster basis. At the same time, the control unit 509 transmits line-number information vPos of the raster data to the color converter 507 and binarizing unit 508. Raster data that has undergone color conversion by the color converter 507 and binarization by the binarizing unit 508 is transmitted to the output unit 504 together with an address sent from the control unit 509.

When image data within the page buffer 506 is thus processed successively on a per-raster basis and conversion processing of all rasters ends, the control unit 509 again transmits a read signal to the input unit 501 and, in response, the input unit 501 transmits the input image of the next page to the page buffer 506. If there is no next page, then the input unit 501 sends back an end signal. As a result, the control unit 509 transmits the end signal to the output unit 504 and all processing ends.

The raster-by-raster input image, which is composed of the colors R, G, B of eight bits each (256 values per color), is sent from the page buffer 506. The color converter 507 converts this image data to raster data, which is composed of the colors C (cyan), M (magenta), Y (yellow), K (block) of eight bits each (256 values per color), and outputs the resultant data to the binarizing unit 508. The latter binarizes the raster-by-raster data of the colors C, M, Y, K of eight bits each (256 values per color) transmitted from the color converter 507 and sends the binarized data to the output unit 504 one bit at a time.

In this embodiment, a case in which processing is executed to binarize all of the colors C, M, Y, K to 1-bit binary data is described. However, a different number of output bits per color and a different number of levels per color may be adopted.

Figure 1:
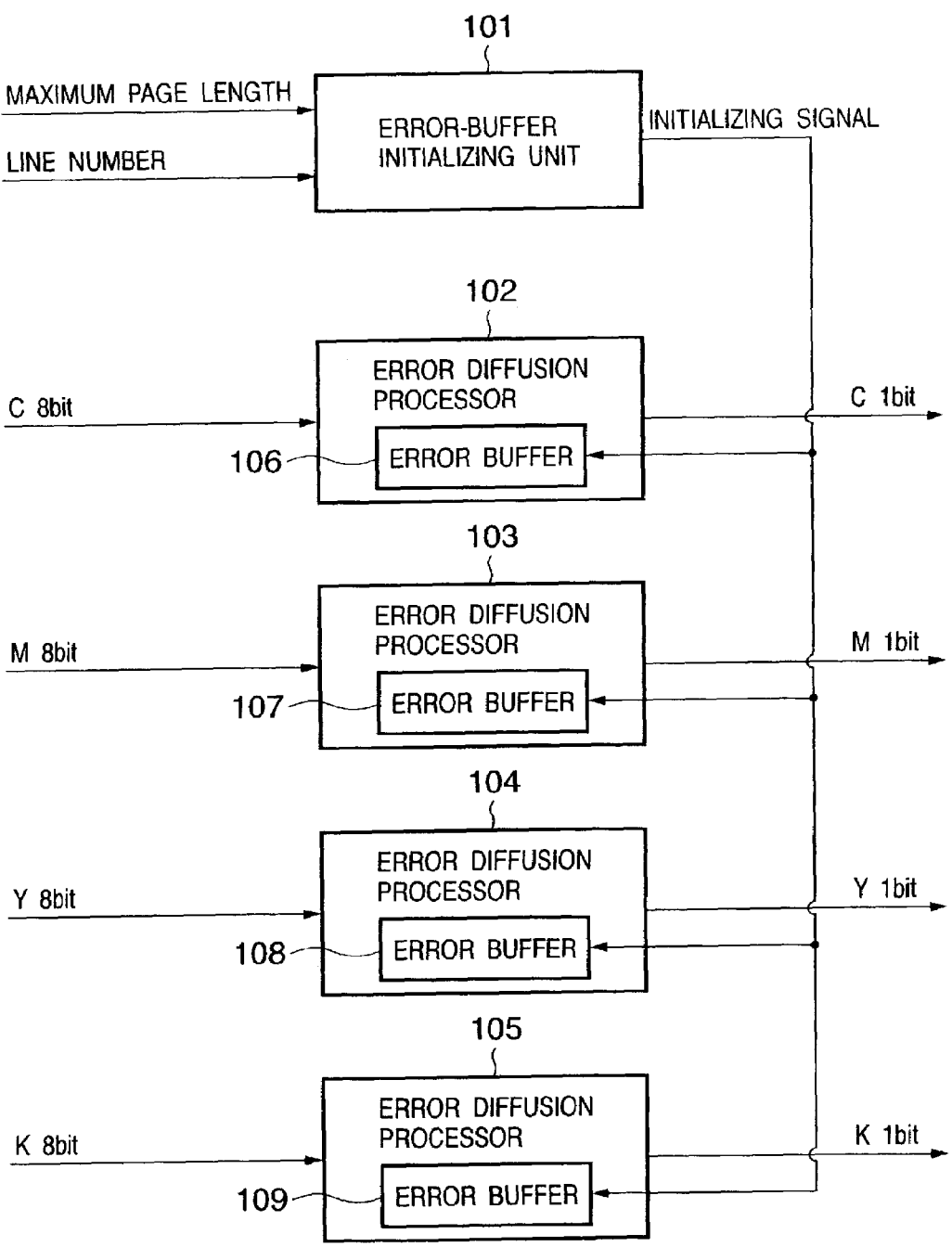
FIG. 1 is a block diagram illustrating the structure of a binarizing unit according to a first embodiment of the present invention.

FIG. 1 is a block diagram illustrating the structure of the binarizing unit 508 according to this embodiment.

As shown in FIG. 1, the binarizing unit 508 includes an error-buffer initializing unit 101 which, on the basis of maximum page length and line-number information, generates and outputs an initializing signal for initializing error buffers. Reference numerals 102, 103, 104 and 105 denote error diffusion processors for subjecting the input 8-bit data of the colors C, M, Y, K, respectively, to error diffusion processing and outputting the processed data. Reference numerals 106, 107, 108 and 109 denote error buffers incorporated within the error diffusion processors 102, 103, 104 and 105, respectively. The error buffers 106, 107, 108 and 109 are used to propagate error in the sub-scanning direction to the next raster. The error values stored in these error buffers are initialized by the initializing signal output from the error-buffer initializing unit 101.

Figure 2:
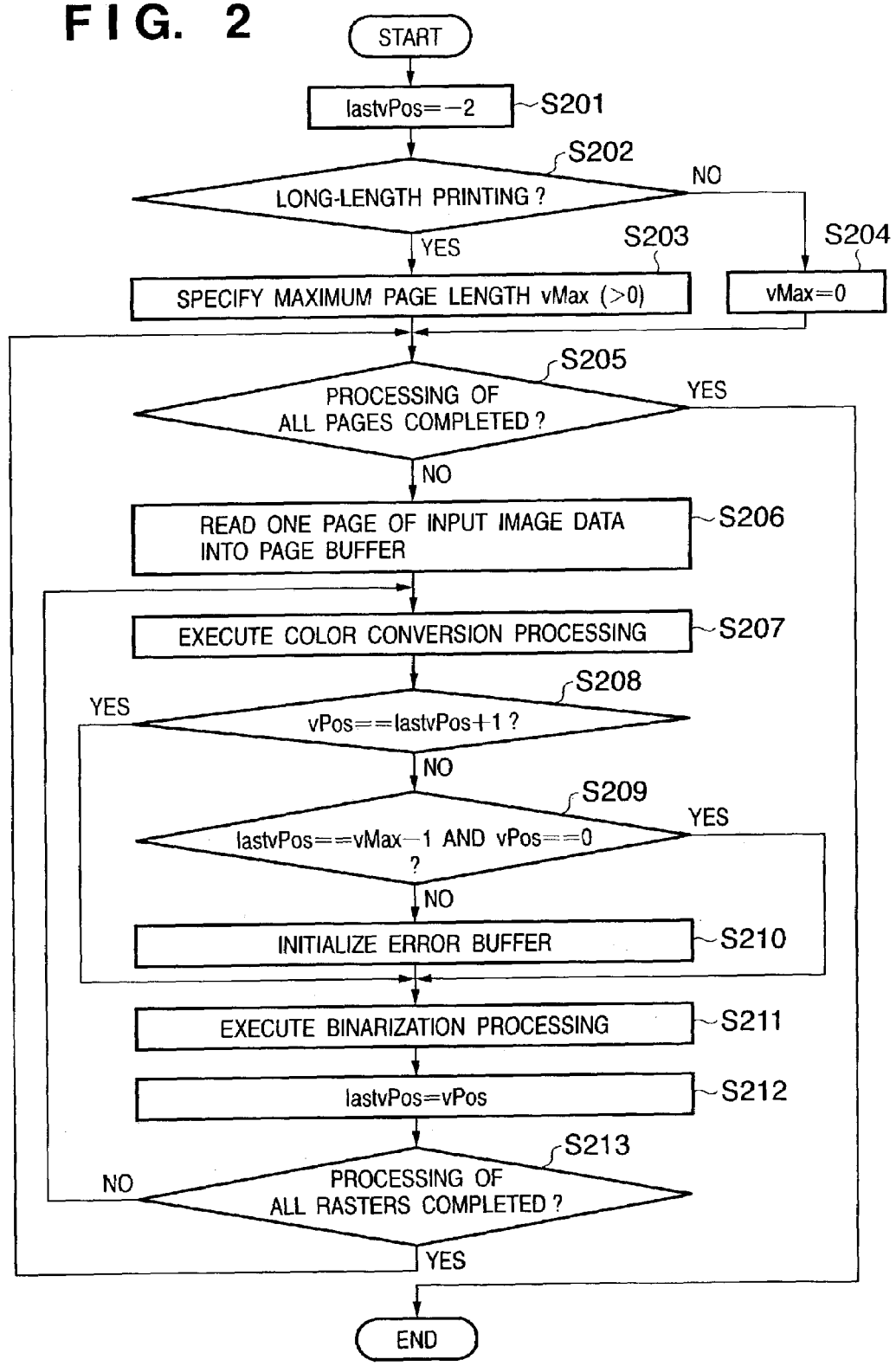
FIG. 2 is a flowchart illustrating the flow of processing according to the first embodiment.

FIG. 2 is a flowchart illustrating the flow of processing by the image processing apparatus of this embodiment. In the description that follows, "a=10" signifies an operation for substituting 10 into a variable a, "a==10" signifies a comparison operation for determining whether the variable a is equal to 10, and "A&&B" signifies "A and B".

First, a variable lastvPos within the error-buffer initializing unit 101 is initialized to −2 (step S201). The variable lastvPos is used to store a line number at which binarization processing was executed. Next, it is determined whether long-length printing has been set (step S202). If long-length printing has been set ("YES" at step S202), then maximum page length that prevailed when the input image was divided into pages is set in a variable vmax within the error-buffer initializing unit 101 (step S203). If long-length printing has not been set ("NO" at step S202), then 0 is set in vMax (step S204).

Next, it is determined whether image processing of all pages of the input image has been completed (step S205). Specifically, if the control unit 509 has transmitted the read signal to the input unit 501 and the input unit 501 has sent back an end signal, then the control unit 509 decides that image processing of all pages has ended and transmits the end signal to the output unit 504, thereby terminating processing. On the other hand, if it is determined that image processing of all pages has not been completed, i.e., that a page for which image processing has not been completed exists, then the input image of the next page is read into the page buffer 506 (step S206).

The control unit 509 transmits R, G, B input image data to the color converter 507 on a per-raster basis and transmits the line number to the color converter 507 and binarizing unit 508. The color converter 507 converts the input image data to C, M, Y, K raster data of eight bits per color and transmits the C, M, Y, K raster data to the error diffusion processors 102, 103, 104, 105, respectively (step S207).

Next, the error-buffer initializing unit 101 within the binarizing unit 508 performs the following comparison operation with regard to the entered vPos and the internally stored lastvPos (step S208):

$$vPos == lastvPos+1$$

(5)

If the result if this comparison operation is true ("YES" at step S208), then this means that the entered line (raster) numbers are consecutive, i.e., processing with regard to the same image on the same page. As a result, control proceeds to binarization processing (step S211).

If the result of the comparison of Eq. (5) is false ("NO" at step S208), on the other hand, then the following comparison operation is performed (step S209):

$$lastvPos == Vmax-1 \&\& vPos == 0 \quad (6)$$

If the result of this comparison operation is true ("YES" at step S209), then this means processing with regard to the same image extending from the trailing edge of the page to the next page. As a result, control proceeds to binarization processing (step S211). If the result of this comparison operation is false ("NO" at step S209), on the other hand, then the error-buffer initializing unit 101 transmits the initializing signal to the error buffers 106, 107, 108, 109, thereby initializing the content of these buffers (step S210). Control then proceeds to binarization processing (step S211).

Binarization processing of all colors of one raster is then executed and vPos is stored in the variable lastvPos within the error-buffer initializing unit 101 (step S212).

Next, it is determined whether binarization processing of all rasters that have been stored in the page buffer 506 has ended (step S213). If binarization processing of all rasters has ended ("YES" at step S213), then control returns to step S205. If processing of all pages has not ended ("NO" at step S205), then the next page is read into the page buffer 506 (step S206). If it is found at step S213 that a raster for which binarization processing has not ended remains ("NO" at step S213), then control returns to step S207 and image processing of the next raster is started.

Thus, processing is terminated only in a case where the processing of all pages has ended at step S205.

The processing (step S210) for initializing error buffers according to this embodiment is executed only when the following two conditions are satisfied simultaneously:

1. the line number of the raster that has undergone binarization immediately previously and the line number of the raster binarized next are nonconsecutive ("NO" at step S208); and
2. the line number of the raster that has undergone binarization immediately previously is not a value indicative of the trailing edge of a page, or the line number of the raster binarized next is not indicative of the leading end of a page ("NO" at step S209).

In other words, initialization of error buffers is not carried out in a case where images are contiguous on the same page and in a case where an image extends from the trailing edge of a page to the next page.

Figure 3:
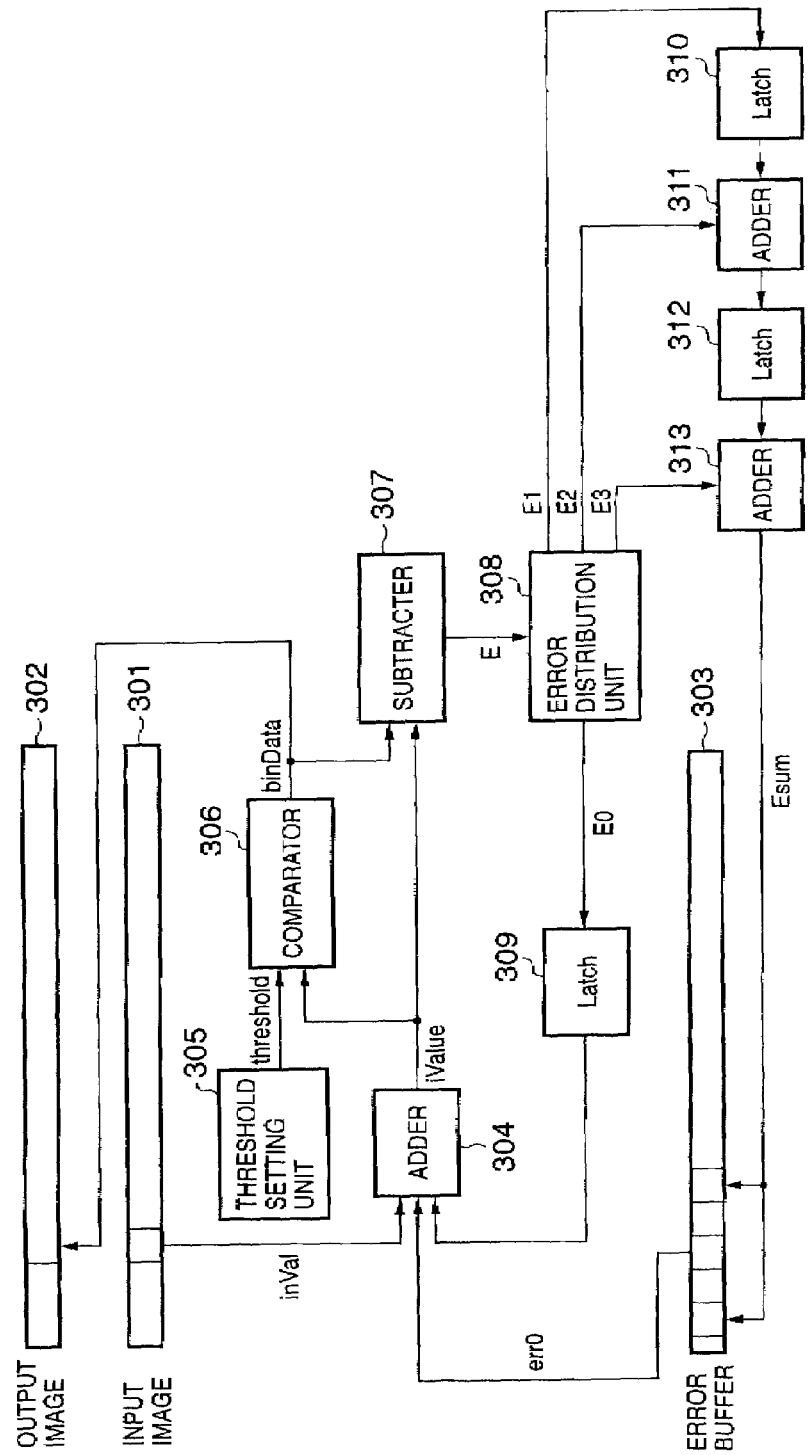
FIG. 3 is a block diagram illustrating an example of binarization processing based upon error diffusion used in this embodiment.

An example of binarization processing by error diffusion at step S211 will be described with reference to FIG. 3. Here a pixel value inVal of a pixel of interest from input raster data 301 transmitted from the color converter 507 is sent to an adder 304.

Error E0 from a latch 309 and error err0 from the preceding raster read out of an error buffer 303 are sent to the adder 304 simultaneously, the following addition processing is executed and an error correction value 1Value is output to a comparator 306 and subtractor 307:

$$1Value = inVal + E0 + err0 \quad (7)$$

A threshold setting unit 305 sends a threshold value "threshold" to the comparator 306. The threshold value "threshold" may be a fixed value or a value that varies depending upon an element such as an input value.

The comparator 306 compares the error correction value 1Value output from the adder 304 and "threshold" output from the threshold setting unit 305 and outputs a binarized result binData to an output image 302 and to the subtractor 307.

The subtractor 307 subtracts binData output from the comparator 306 from 1Value output from the adder 304 by the following processing and outputs the result E to an error distribution unit 308:

$$E = 1Value - binData \quad (8)$$

The error distribution unit 308 performs the operations of Equations (1) to (4) using the error E output from the subtractor 307, and transmits distributed errors E0, E1, E2, E3 to latches 309, 310 and adders 311, 313, respectively.

Figure 4:
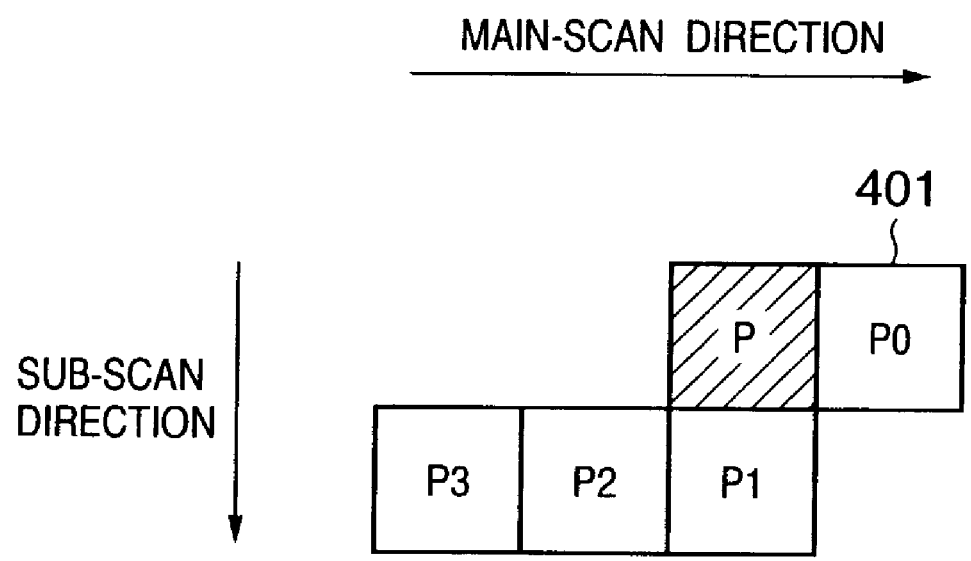
FIG. 4 is a diagram illustrating an example of an error distribution window used in this invention.

The error distributed corresponds to the error window 401 in FIG. 4. The distributed error E0 is input to the latch 309 and is input to the adder 304 again after being delayed by one pixel. Further, the distributed error E1 is input to the latch 310, a delay of one pixel is applied and then the resultant signal is input to the adder 311 so as to be added to the distributed error E2. The output of the adder 311 is input to the latch 312, a delay of one pixel is applied and then the resultant signal is input to the adder 313 so as to be added to the distributed error E3. An output Esum from the adder 313 is written to the error buffer 303.

In this embodiment, the location at which error is written is two pixels to the left or two pixels to the right of the pixel of interest owing to the direction of binarization processing. The direction of binarization processing is switched every several lines.

<Second Embodiment>

A second embodiment of an image processing apparatus according to the present invention will now be described. The image processing apparatus according to the second embodiment has a structure similar to that of the first embodiment and components similar to those of the first embodiment need not be described again. The following description will focus on the characterizing features of the second embodiment.

The image processing apparatus of the second embodiment differs from that of the first embodiment in that length in the sub-scanning direction (the direction in which printing paper is transported) can be specified page by page in a case where long-length printing is performed.

Figure 9:
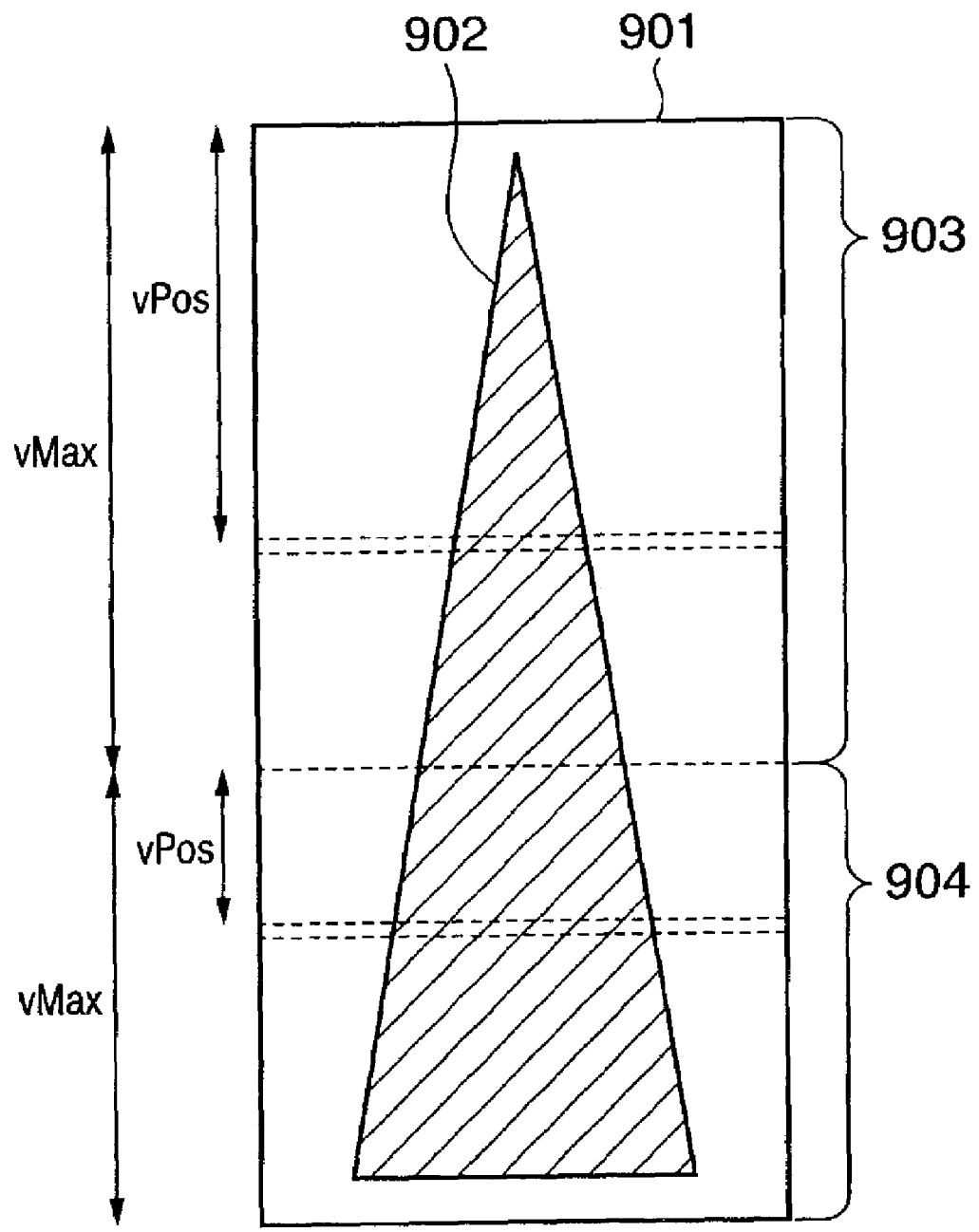
FIG. 9 is a diagram illustrating an example of an elongated sheet capable of being dealt with by a second embodiment of the present invention.

FIG. 9 is a diagram illustrating an example of long-length printing according to this embodiment. Here a printing medium 901 used has a length greater than that of one page of a cut sheet used ordinarily but less than that of two pages of cut sheets. An image 902 is printed from one page to the next. In this case, by making length 903 of page 1 the same as that of an ordinary cut sheet and making length 904 of page 2 the remaining length, print data can be generated by executing image processing efficiently with respect to printing media of various lengths.

Figure 10:
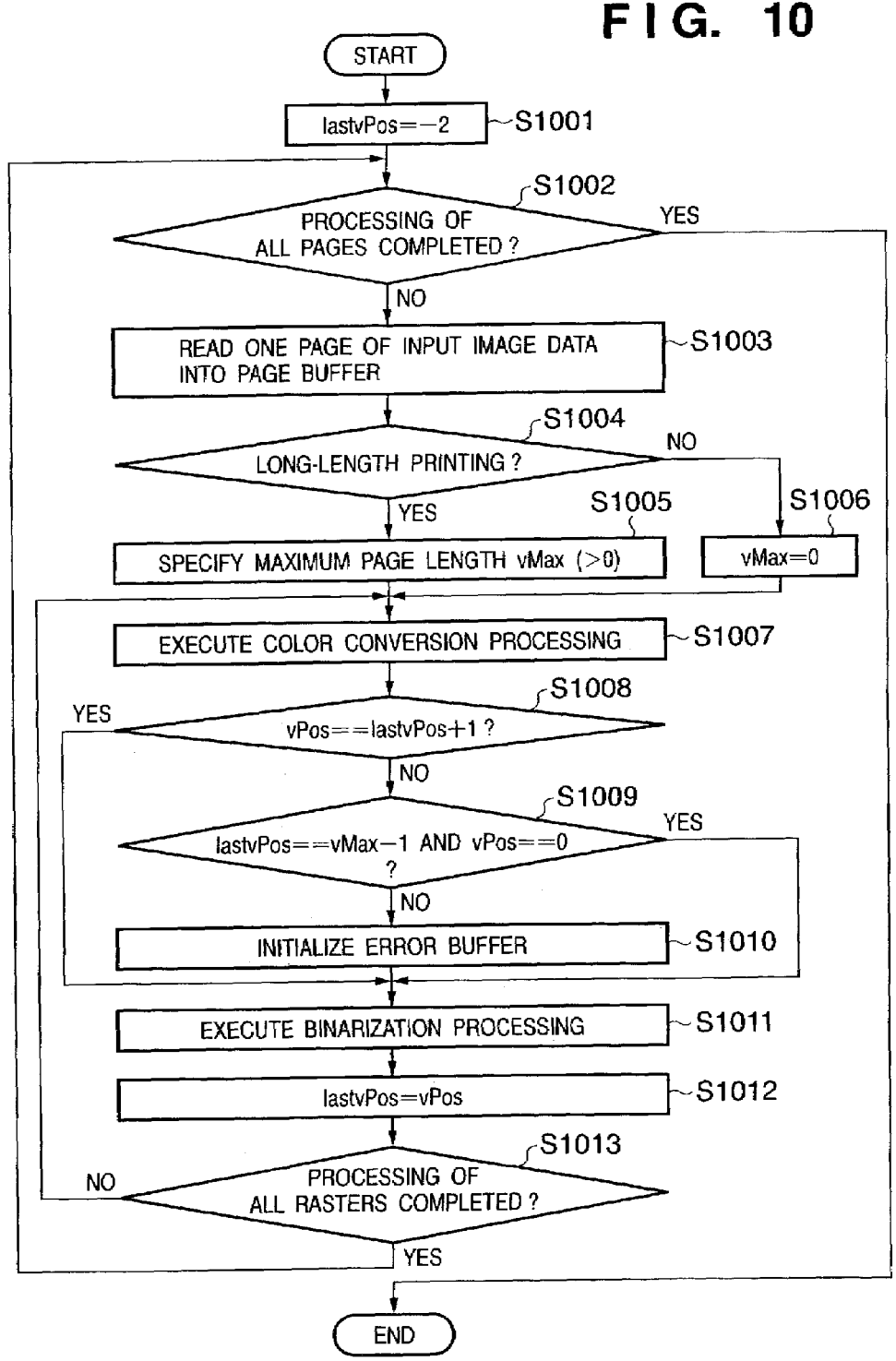
FIG. 10 is a flowchart illustrating the flow of processing according to the second embodiment.

The flow of processing executed by the image processing apparatus of this embodiment will be described with reference to the flowchart of FIG. 10.

First, the variable lastvPos within the error-buffer initializing unit 101 is initialized to −2 (step S1001). The variable lastvPos is used to store a line number at which binarization processing was executed. Next, it is determined whether image processing of all pages of the input image has been completed (step S1002).

Specifically, if the control unit 509 has transmitted the read signal to the input unit 501 and the input unit 501 has sent back an end signal, then the control unit 509 decides that image processing of all pages has ended and transmits the end signal to the output unit 504, thereby terminating processing. On the other hand, if the end signal has not been sent back from the input unit 501, then it is determined that there is an unprocessed page and the input image of the next page is read into the page buffer 506 (step S1003).

Next, it is determined whether long-length printing has been set (step S1004). If long-length printing has been set ("YES" at step S1004), then maximum page length corresponding to the input image that has been read into the page buffer 506 is set to the variable vMax within the error-buffer initializing unit 101 (step S1005). Otherwise, 0 is set to vMax (step S1006).

Thereafter, the raster-by-raster R, G, B input image data is sent to the color converter 507 and the line number is transmitted to the color converter 507 and binarizing unit 508. The color converter 507 converts the input image data to C, M, Y, K raster data of eight bits per color and transmits the C, M, Y, K raster data to the error diffusion processors 102, 103, 104, 105, respectively (step S1007).

Next, the error-buffer initializing unit 101 within the binarizing unit 508 performs the following comparison operation with regard to the entered vPos and the internally stored lastvPos (step S1008):

$$vPos == lastvPos + 1 \quad (9)$$

If the result if this comparison operation is true ("YES" at step S1008), then this means that the entered line numbers are consecutive, i.e., processing with regard to the same image on the same page. As a result, control proceeds to binarization processing (step S1011).

If the result of the comparison of Eq. (9) is false ("NO" at step S1008), on the other hand, the following comparison operation is performed (step S1009):

$$lastvPos == Vmax - 1 \&\& vPos == 0 \quad (10)$$

If the result of this comparison operation is true ("YES" at step S1009), then this means processing with regard to the same image extending from the trailing edge of the page to the next page. As a result, control proceeds to binarization processing (step S1011). Otherwise, the error-buffer initializing unit 101 transmits the initializing signal to the error buffers 106, 107, 108, 109, thereby initializing the content of these buffers (step S1010). Control then proceeds to binarization processing (step S1011).

Binarization processing of all colors of one raster is then executed and vPos is stored in the variable lasvPos within the error-buffer initializing unit 101 (step S1012).

Next, it is determined whether binarization processing of all rasters that have been stored in the page buffer 506 has ended (step S1013). If binarization processing of all rasters has ended ("YES" at step S1013), then control returns to step S1002, where it is determined whether the processing of all pages has ended. On the other hand, if it is found at step S213 that a raster for which binarization processing has not ended remains ("NO" at step S1013), then control returns to step S1007 and image processing of the next raster is started.

Thus, processing is terminated only in a case where the processing of all pages has ended at step S1002.

In this embodiment also, conditions for initializing error buffers are similar to those of the first embodiment, and initialization of error buffers is not carried out in a case where images are contiguous on the same page and in a case where an image extends from the trailing edge of a page to the next page.

<Other Embodiments>

The present invention can be applied to a system comprising a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments being realized by executing the program codes which are read by a computer, the present invention also includes a case where an OS (operating system) or the like working on the computer performs parts or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

If the present invention is realized as a storage medium, program codes corresponding to the above mentioned flowcharts (FIG. 2 and/or FIG. 10) are to be stored in the storage medium.

As is apparent, many different embodiments of the present invention can be made without departing from the spirit and scope thereof, so it is to be understood that the invention is not limited to the specific embodiments thereof except as defined in the appended claims.

What is claimed is:

1. An image processing apparatus comprising:
   a page buffer for storing entered image data on a per-page basis; and
   binarizing means for subjecting image data, which has been stored in said page buffer, to error diffusion processing on a per-raster basis, thereby generating binarized data, and outputting the binarized data, wherein
   said binarizing means includes:
      an error buffer for storing sub-scanning direction error due to the error diffusion processing; and
      error-buffer initializing means for initializing said error buffer based upon positions, in the sub-scanning direction, of a raster that underwent error diffusion processing immediately previously and a raster to undergo error diffusion processing, and number of rasters on a page.

2. The apparatus according to claim 1, wherein the number of rasters on the page can be set with regard to each page when the apparatus has been set in such a manner that image data extending over a plurality of pages is processed as contiguous image data.

3. The apparatus according to claim 1, wherein said binarizing means has said error buffer for each of a plurality of colors, and said error-buffer initializing means initializes said error buffers simultaneously.

4. The apparatus according to claim 1, wherein said error-buffer initializing means initializes said error buffer in a case where positions, in the sub-scanning direction, of a raster that underwent error diffusion processing immediately previously and a raster to undergo error diffusion processing are not contiguous and, moreover, the raster that underwent error diffusion processing immediately previously is not a trailing-end position of a page or the raster to undergo error diffusion processing is not a leading-end position of a page.

5. The apparatus according to claim 1, further comprising color conversion means for subjecting entered color image data to color conversion processing, wherein the binarized data is output data applied to a printer.

6. An image processing method comprising:
a page buffering step of storing entered image data in a page buffer on a per-page basis; and
a binarizing step of subjecting image data, which has been stored in said page buffer, to error diffusion processing on a per-raster basis, thereby generating binarized data, and outputting the binarized data, wherein
said binarizing step includes:
an error buffering step of storing subscanning direction error due to the error diffusion processing in an error buffer; and
an error-buffer initializing step of initializing said error buffer based upon positions, in the sub-scanning direction, of a raster that underwent error diffusion processing immediately previously and a raster to undergo error diffusion processing, and number of rasters on a page.

7. The method according to claim 6, wherein the number of rasters on the page can be set with regard to each page when the method has been set in such a manner that image data extending over a plurality of pages is processed as contiguous image data.

8. The method according to claim 6, wherein said binarization step stores the error, which is associated with each of a plurality of colors, in a respective one of error buffers provided for respective ones of the colors, and said error-buffer initializing step initializes said error buffers simultaneously.

9. The method according to claim 6, wherein said error-buffer initializing step initializes said error buffer in a case where positions, in the sub-scanning direction, of a raster that underwent error diffusion processing immediately previously and a raster to undergo error diffusion processing are not contiguous and, moreover, the raster that underwent error diffusion processing immediately previously is not a trailing-end position of a page or the raster to undergo error diffusion processing is not a leading-end position of a page.

10. The method according to claim 6, further comprising a color conversion step of subjecting entered color image data to color conversion processing, wherein the binarized data is output data applied to a printer.

11. A printer driver installed in a host device connected to a printer, comprising code of a program for implementing the following steps:
a page buffering step of storing entered image data in a page buffer on a per-page basis; and
a binarizing step of subjecting image data, which has been stored in said page buffer, to error diffusion processing on a per-raster basis, thereby generating binarized data, and outputting the binarized data, wherein
said binarizing step includes:
an error buffering step of storing sub-scanning direction error due to the error diffusion processing in an error buffer; and
an error-buffer initializing step of initializing said error buffer based upon positions, in the sub-scanning direction, of a raster that underwent error diffusion processing immediately previously and a raster to undergo error diffusion processing, and number of rasters on a page.

12. A storage medium storing a printer driver installed in a host device connected to a printer, comprising code of a program for implementing the following steps:
a page buffering step of storing entered image data in a page buffer on a per-page basis; and
a binarizing step of subjecting image data, which has been stored in said page buffer, to error diffusion processing on a per-raster basis, thereby generating binarized data, and outputting the binarized data, wherein
said binarizing step includes:
an error buffering step of storing subscanning direction error due to the error diffusion processing in an error buffer; and
an error-buffer initializing step of initializing said error buffer based upon positions, in the sub-scanning direction, of a raster that underwent error diffusion processing immediately previously and a raster to undergo error diffusion processing, and number of rasters on a page.

* * * * *

UNITED STATES PATENT AND TRADEMARK OFFICE
CERTIFICATE OF CORRECTION

PATENT NO.         : 7,218,416 B2
APPLICATION NO. : 10/420729
DATED                 : May 15, 2007
INVENTOR(S)       : Toshinori Igari It is certified that error appears in the above-identified patent and that said Letters Patent is hereby corrected as shown below:

ON THE TITLE PAGE [56] REFERENCES CITED:

Other Publications, insert: --OTHER PUBLICATIONS
"An Adaptive Algorithm for Spatial Gray Scale", by R. Floyd, et al., SID International Symposium Digest of Technical Papers, vol, 4.3, 1975"--

COLUMN 1:

Line 47, "$v \leqq T$" should read --$v < T$--.

COLUMN 4:

Line 59, "sub-canning" should read --sub-scanning--; and
Line 66, "sub-canning" should read --sub-scanning--.

COLUMN 5:

Line 64, "(block)" should read --(black)--.

COLUMN 7:

Line 1, "if" should read --of--.

UNITED STATES PATENT AND TRADEMARK OFFICE
CERTIFICATE OF CORRECTION

PATENT NO. : 7,218,416 B2
APPLICATION NO. : 10/420729
DATED : May 15, 2007
INVENTOR(S) : Toshinori Igari It is certified that error appears in the above-identified patent and that said Letters Patent is hereby corrected as shown below:

COLUMN 9:

Line 31, "if" should read --of--; and
Line 51, "lasvPos" should read --lastvPos--.

Signed and Sealed this

Eighteenth Day of December, 2007

JON W. DUDAS
*Director of the United States Patent and Trademark Office*